United States Patent [19]

Rideout et al.

[11] B 3,923,963
[45] Dec. 2, 1975

[54] METHOD FOR PURIFICATION OF HYDROGEN CHLORIDE
[75] Inventors: Walker H. Rideout; Palmer S. Glenn, both of Corpus Christi, Tex.
[73] Assignee: PPG Industries, Inc., Pittsburgh, Pa.
[22] Filed: Dec. 15, 1972
[21] Appl. No.: 315,397
[44] Published under the Trial Voluntary Protest Program on January 28, 1975 as document no. B 315,397.

[52] U.S. Cl. ............... 423/481; 423/486; 423/488
[51] Int. Cl.² ............................................. C01B 7/08
[58] Field of Search ................... 423/488, 486, 481

[56] References Cited
UNITED STATES PATENTS

| | | | |
|---|---|---|---|
| 1,421,733 | 7/1922 | Snelling | 423/488 |
| 2,196,246 | 4/1940 | Brown et al. | 423/488 |
| 3,260,059 | 7/1966 | Rosenberg et al. | 423/488 X |
| 3,356,749 | 12/1967 | Van Dijk | 423/488 X |
| 3,377,137 | 4/1968 | Latham, Jr. | 423/486 X |
| 3,446,586 | 5/1969 | Young | 423/488 |

FOREIGN PATENTS OR APPLICATIONS

| | | | |
|---|---|---|---|
| 609,682 | 11/1960 | Canada | 423/488 |
| 681,079 | 2/1964 | Canada | 423/488 |

*Primary Examiner*—Edward Stern
*Attorney, Agent, or Firm*—Roger S. Benjamin

[57] ABSTRACT

Disclosed is a method for purifying hydrogen chloride containing organic impurities. The method involves contacting the impure hydrogen chloride with chlorine, preferably at an elevated temperature. The organic impurities are thereby chlorinated to higher molecular weight organic compounds which are readily removed from the hydrogen chloride.

9 Claims, No Drawings

METHOD FOR PURIFICATION OF HYDROGEN CHLORIDE

The thermal cracking of ethylene dichloride to form vinyl chloride and hydrogen chloride by the reaction:

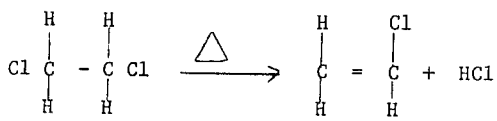

is a well-known method for the production of vinyl chloride. The process is most economical when the by-product HCl is marketed in addition to the vinyl chloride. However, the co-produced HCl from this operation is normally contaminated with vinyl chloride, ethyl chloride and vinylidene chloride plus varying amounts of ethylene dichloride and trichloroethylene as well as other high molecular weight organic compounds. Passing the HCl through a carbon bed removes most of the heavier organic compounds, but ethylene, acetylene, vinyl chloride, ethyl chloride and vinylidene chloride are not adsorbed. The presence of greater than about 50 parts per million of these organic contaminants in HCl makes it unsaleable for certain uses such as when the HCl is to be used in the production of other chemical compounds such as methyl chloride, ethylene dichloride and methylchloroform. Accordingly, it would be desirable to provide a convenient method for the removal of small amounts of ethylene, acetylene, vinyl chloride, ethyl chloride and vinylidene chloride from HCl.

The present invention is a method of removing organic impurities from hydrogen chloride. The method involves contacting the HCl containing organic impurities such as acetylene, ethylene, vinyl chloride and ethyl chloride and vinylidene chloride with chlorine in a reaction zone. The organic impurities are chlorinated to higher molecular weight compounds, e.g., hexachloroethane, tetrachloroethylene, trichloroethylene, and chlorinated ethanes, which are readily removed from the HCl. In a preferred embodiment, the chlorine and impure HCl are contacted in the presence of a bed of activated carbon at an elevated temperature.

The temperature at which the method is carried out will normally be at least about 20°C. with a temperature in the range of from 100° to 350°C. being typical and a temperature in the range of 180° to 230°C. being preferred. Pressure is not critical; the method works effectively at atmospheric as well as sub-atmospheric and super-atmospheric pressures. However, for most effective chlorination of organic impurities, it is preferred to operate at a pressure greater than atmospheric and typically at a pressure of from 50 to 150 pounds per square inch gauge.

The nominal residence time is the period during which an individual molecule would remain in the reaction zone, assuming the molar flow rate of the products remains the same as that of the reactants. The nominal residence time will vary with temperature and pressure. Where ambient temperature gases are introduced into a zone providing reasonably efficient heat transfer, the volumetric change in the gases due to preheating is taken into account in calculating the nominal residence time. Pressure drops through the reactor are ignored unless they are extreme. The nominal residence time is a convenient easily calculated, simplified parameter for comparing the physical and chemical kinetic properties of the reactions of the present invention. Normally the nominal residence time in the total reactor will be at least one second with a time of about 20 to about 100 seconds being typical. The nominal residence time over the carbon bed, if any, is usually in the range of from about 5 to about 60 seconds.

The concentration of organic impurities in the HCl will generally be less than 10,000 parts per million and normally will be in the range of from 10 to 5,000 parts per million by volume of HCl; although organic impurities in higher and lower concentrations are effectively removed by the present method. For most effective removal of organic impurities, the concentration of $Cl_2$ in the HCl to be purified is normally greater, on a mole basis, than that of the organic impurities. A mole ratio of chlorine to organic impurities in the range of from stoichiometric to 10:1 will normally be employed with a mole ratio in the range of from 3:1 to 5:1 being preferred.

The preferred method of practicing the invention is to bring into contact the chlorine, the impure HCl and a bed of activated carbon. The use of a carbon bed provides a process by which organic impurities are effectively removed at lower ratios of chlorine to organic impurity than is the case when activated carbon is not used. Use of a bed of activated carbon will also result in purer HCl exiting the reactor since some of the products of chlorination of the organic impurities will be adsorbed by the carbon and thereby removed from the HCl stream. Normally, even when the impure HCl and chlorine are not contacted in the presence of a bed of activated carbon, the gas stream will be passed over such a bed after reaction to remove the chlorinated organic compounds produced. When the impure HCl and chlorine are contacted over a carbon bed, excess chlorine will also be retained by the carbon bed to a certain extent. At higher ratios of chlorine to organic impurity, some chlorine will exit the reactor with the treated HCl. In addition not all of the chlorinated organic impurities will be absorbed by the carbon bed. Passing the HCl over a second carbon bed will effectively remove remaining chlorine and chlorinated organics from the HCl stream.

The type of activated carbon used is not critical provided it has a sufficiently high surface area. The surface area of the activated carbon employed will normally be greater than 300 square meters per gram and preferably be in the range of from 1,000 to 2,000 square meters per gram. Surface area is intended to mean BET surface area as measured using nitrogen gas. The BET method of measuring surface area is described in the Journal of the American Chemical Society, Vol. 60, pg. 304 (1930). The source of the activated carbon can be almost any carbonaceous material such as blood, bones, hardwood and softwood, corncobs, kelp, coffee beans, rice hulls, fruit pits and nut shells. The preferred activated carbon is that which is prepared by the high temperature steam activation of bituminous coal.

The invention is further illustrated by the following examples in which parts per million (ppm) is intended to refer to parts per million by volume of HCl.

EXAMPLE I

A two-inch diameter 6 foot long stainless steel pipe, electrically traced and thermally insulated, was used as the reactor in the following experiments. The lower 4 feet of the reactor was filled with nickel Raschig rings for better pre-heating of the gases entering the reactor.

Above the nickel rings was a porous plate which supported a 20 inch activated carbon bed in a reactor section which was 2 feet in length. A mixture of HCl, $Cl_2$ and organic contaminants was fed to the bottom of the pre-heater through rotameters and passed through the activated carbon bed. The gases exited the reactor through a Moore regulator, used to maintain pressure on the system, to a sampling device and a water scrubber. The temperatures of the preheater and the reactor were monitored by sliding thermocouples mounted in thermowells in both sections.

The reactor was heated to within 10°C. of the desired temperature while feeding HCl at a rate of 12 grams per minute. Then the organic contaminants and the chlorine were introduced at the desired ratio of chlorine to organics. The resulting exotherm usually brought the reactor section to the desired temperature. The reactor was allowed to run under these conditions for at least four hours to attain equilibrium. Samples were taken of the exit gases for $Cl_2$ analysis and gas chromatographic scan. The chlorine feed was then shut off and a feed sample of the gas entering the reactor was taken. Finally, for each run, the organic contaminants feed was turned off to sample the HCl entering the reactor. Chlorine in the exit gas was determined either iodometrically or spectrophotometrically using o-tolidene as indicator. Contaminants in the exit gas, feed gas and HCl were determined by use of a Varian 1200 gas chromatograph using a Poropak T column.

A sample of HCl contaiminated with 1280 parts per million acetylene and 315 parts per million ethylene was passed over a 20 inch bed of activated carbon supplied by Pittsburgh Activated Carbon Co. (made from bituminous coal, surface area 1050–1150 square meters per gram, termed BPL) at 200°C. with a nominal residence time over the activated carbon bed of 24 seconds, and 91 seconds in the reactor. Pressure was maintained at 80 p.s.i.g. Sufficient $Cl_2$ was introduced to provide 1.85 moles of chlorine per mole of organic contaminant. Analysis of the exit gas disclosed that the ethylene and acetylene were reduced to a level not detectable by gas chromatography, i.e., less than 1 part per million. There were found to be 31 parts per million chlorine in the exit gas.

by gas chromatography. Less than 1 ppm chlorine was found in the exit gas.

EXAMPLE III

In order to determine the preferred nominal residence times in the reactor and over the activated carbon for removal of all contaminants, half of the activated carbon bed was removed. Maintaining the same flow rate over half the carbon bed essentially reduced the nominal residence time over the carbon bed by half resulting in the nominal residence time of 12 seconds over the bed and a total reactor nominal residence time of 95 seconds. Other parameters were maintained as in Example II except that the temperature varied between 201° and 203°C. Analysis of the exit gas indicated that all detectable organic contaminants had been removed although 2500 ppm chlorine remained in the treated HCl.

EXAMPLE IV

An experiment was carried out in a manner similar to that of the previous examples except that the length of the carbon bed was again reduced by half resulting in a nominal residence time of 6 seconds over the bed and a total nominal residence time of 95 seconds. The temperature ranged from 204° to 206°C. A contaminated HCl stream containing 525 ppm ethylene, 1633 ppm acetylene, 206 ppm vinyl chloride and 590 ppm ethyl chloride was passed through the reactor along with chlorine in a ratio of chlorine to organics of 3.8 to 1. No ethylene, acetylene or vinyl chloride was detected in the exit gas. Ethyl chloride and chlorine were detected in amounts of 176 ppm and 2300 ppm, respectively. The presence of ethyl chloride in the exit gas indicated that the nominal residence time of 6 seconds was insufficient to remove all organic contaminants although unsaturated organics were effectively removed.

EXAMPLE V

In this experiment, the results of which are set out in Table 1, the carbon bed was removed entirely and an HCl stream containing 601 ppm ethylene, 1545 ppm acetylene, 307 ppm vinyl chloride and no ethyl chloride was passed through the reactor.

TABLE 1

| Reaction Conditions | | | | | |
|---|---|---|---|---|---|
| Carbon Bed: | | None | | | |
| Nominal Residence Time: | | Total Reactor - 100 seconds | | | |
| | | Carbon Bed Zone - 0 seconds | | | |
| Temperature: | | 200°C. | | | |
| $Cl_2$/Organic | Contaminants in Treated HCl, ppm | | | | |
| Molar Ratio | Ethylene | Acetylene | Vinyl Chloride | Ethyl Chloride | $Cl_2$ |
| 3.1 | 7 | 1182 | 121 | 41 | 2000 |
| 3.7 | ND* | 771 | ND* | 20 | ** |

* Not detected
** No analysis for chlorine was made in this experiment.

EXAMPLE II

The procedure of Example I was repeated using HCl contaminated with 1852 ppm acetylene, 357 ppm ethylene, 510 ppm ethyl chloride and 204 ppm vinyl chloride. With the temperature maintained at 201° to 202°C., the contaminated HCl was fed into the reactor with chlorine in a molar ratio of chlorine ot organics of 3.4 to 1. Analysis of the exit gas revealed that the organic level had been reduced to a level not detectable Although ethyl chloride was omitted from the organic contaminants in the feed HCl, some was found in the exit gas indicating that some hydrochlorination of ethylene had occurred in this experiment.

EXAMPLE VI

A stream of HCl contaminated with varying amounts of acetylene was contacted with chlorine in a 2 inch diameter reactor having a 12 inch preheater, a 20 inch carbon bed and a 16 inch void space. The reactor was operated at a variety of temperatures, pressures and molar ratios of chlorine to acetylene. The temperature and pressure were varied in order to vary the nominal residence time of the gases within the reaction zone. The results of these experiments are shown in Table 2.

TABLE 2

| Run No. | Average Reaction Temperature, °C. | HCl gm./min. | Pressure (p.s.i.g.) | Nominal Residence Time Over Carbon Bed (sec.) | Total Nominal Residence Time (sec.) | $C_2H_2$ in Feed HCl, ppm | Molar Ratio $Cl_2/C_2H_2$ | $C_2H_2$ in Treated HCl, ppm |
|---|---|---|---|---|---|---|---|---|
| 1 | 22 | 6.0 | ~0.3 | 11.9 | 31.2 | 2,000 | 1.1 | 1,400 |
| 2 | 52 | 6.0 | ~0.3 | 10.7 | 28.4 | 2,000 | 1.1 | 1,700 |
| 3 | 132 | 6.0 | ~0.3 | 8.6 | 22.7 | 1,300 | 1.6 | 8 |
| 4 | 217 | 6.0 | ~0.4 | 7.2 | 17.9 | 2,000 | 1.1 | 8 |
| 5 | 52 | 6.5 | 50 | 42.8 | 116.0 | 1,200 | 0.95 | 610 |
| 6 | 80 | 6.5 | 50 | 39.5 | 106.8 | 1,200 | 1.7 | 29 |
| 7 | 76 | 6.5 | 50 | 39.5 | 108.0 | 940 | 1.2 | 13 |

EXAMPLE VII

Various types of activated carbon were tested in order to determine their efficiency in the process of the present invention. The experiments were carried out in the reactor described in Example I. In each run the reactor temperature was raised to the desired value and gaseous HCl containing measured amounts of acetylene was fed simultaneously with the desired amount of chlorine to the reactor which contained a 20 inch bed of the activated carbon being tested. The tests were generally run for approximately two hours before samples were taken for analysis. The results obtained with the various activated carbons are presented in Tables 3–a through 3–c.

TABLE 3a

Chlorination of Acetylene in HCl Over Pittsburgh Activated Carbon BPL* at 105°C. and 81 p.s.i.g.

| Run No. | Molar Ratio $Cl_2/C_2H_2$ | $C_2H_2$ in Feed HCl, ppm | $C_2H_2$ in Treated HCl, ppm | Unreacted $Cl_2$ in Treated HCl, ppm |
|---|---|---|---|---|
| 1 | 1.4 | 1150 | 6 | 1000 |
| 2 | 1.4 | 1150 | 1 | 1100 |
| 3 | 1.4 | 1150 | 8 | 1100 |
| 4 | 1.3 | 1150 | 58 | 950 |
| 5 | 1.8 | 1150 | 14 | 2500 |
| 6 | 1.1 | 1150 | 24 | 250 |
| 7 | 1.06 | 1150 | 49 | 180 |

*This carbon which is made from bituminous coal and has a surface area of 1050–1150 $m^2$/gram was purchased from the Pittsburgh Activated Carbon Company.

TABLE 3b

Chlorination of Acetylene in HCl Over Cocoanut Charcoal at 105°C. and 80 p.s.i.g.

| Run No. | Molar Ratio $Cl_2/C_2H_2$ | $C_2H_2$ in Feed HCl, ppm | $C_2H_2$ in Treated HCl, ppm | Unreacted $Cl_2$ in Treated HCl |
|---|---|---|---|---|
| 1 | 1.5 | 1000 | 87 | 1400 ppm |
| 2 | 1.9 | 1000 | 79 | 2400 ppm |
| 3 | 2.1 | 3470 | 109 | 1.02 wt.% |
| 4 | 2.3 | 3470 | 184 | 1.27 wt.% |
| 5 | 2.6 | 3470 | 124 | 1.56 wt.% |
| 6 | 3.7 | 1000 | 1 | 0.77 wt.% |

TABLE 3c

Chlorination of Acetylene in HCl Over Pittsburgh Activated Carbon CPG* at 105°C. and 82 p.s.i.g.

| Run No. | $C_2H_2$ in Feed HCl, ppm | Molar Ratio $Cl_2/C_2H_2$ | $C_2H_2$ in Treated HCl, ppm |
|---|---|---|---|
| 1 | 1480 | 1.66 | 36 |
| 2 | 1480 | 1.82 | 19 |

*This carbon is made from bituminous coal and is acid-washed to leach out iron. It has a surface area of about 900 $m^2$/gram and was purchased from the Pittsburgh Activated Carbon Company.

We claim:

1. A method of purifying by-product hydrogen chloride obtained in the process of thermally cracking ethylene dichloride to form vinyl chloride, said by-product hydrogen chloride containing more than 50 ppm of organic impurities selected from the group consisting of ethylene, acetylene, vinyl chloride, ethyl chloride and vinylidene chloride; wherein the improvement comprises reducing by absorption and removal the said selected organic impurities in by-product hydrogen chloride to a level of less than 50 ppm by combining in a reaction zone (a) the impure by-product hydrogen chloride; (b) $Cl_2$, in at least a stoichiometric mole ratio to said organic impurities; and (c) activated carbon, at a temperature of at least 80°C., and a nominal residence time of at least 1 second.

2. The method of claim 1 wherein the temperature is in the range from 100° to 350°C.

3. The method of claim 2 wherein the temperature is in the range from 180° to 230°C.

4. The method of claim 1 wherein the activated carbon has a surface area of greater than 300 square meters per gram.

5. The method of claim 4 wherein the activated carbon has a surface area of 1,000 to 2,000 square meters per gram.

6. The method of claim 1 wherein the pressure is maintained in the range of from 50 to 150 pounds per square inch gauge.

7. The method of claim 1 wherein the impure hydrogen chloride and chlorine are contacted with the activated carbon for a period of from 5 to 60 seconds.

8. The method of claim 1 wherein the mole ratio of chlorine to organic impurity is from 1:1 to 10:1.

9. The method of claim 8 wherein the mole ratio of chlorine to organic impurity is in the range from 3:1 to 5:1.

* * * * *